United States Patent
Kakuno

(10) Patent No.: US 7,443,519 B1
(45) Date of Patent: Oct. 28, 2008

(54) PRINTER SYSTEM FLEXIBLY COMPATIBLE WITH PLURALITY OF PRINTER CONTROL LANGUAGES (PCL) USING INTERMEDIATE AND RASTER CODES

(75) Inventor: Norishige Kakuno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1826 days.

(21) Appl. No.: 09/624,224

(22) Filed: Jul. 24, 2000

(30) Foreign Application Priority Data

Jul. 22, 1999 (JP) .............................. 11-208293
Mar. 22, 2000 (JP) .............................. 2000-080470

(51) Int. Cl.
*G06F 3/12* (2006.01)
*G06F 15/00* (2006.01)
*G03G 15/00* (2006.01)

(52) U.S. Cl. .................... 358/1.13; 358/1.16; 399/6

(58) Field of Classification Search ............. 358/1.13, 358/1.15, 1.1, 1.9, 1.11, 1.12, 1.14, 1.16, 358/1.17, 1.18; 399/6
See application file for complete search history.

(56) References Cited

U.S. PATENT DOCUMENTS 5,671,341 A * 9/1997 Kashiwazaki et al. ...... 358/1.13
6,441,919 B1 * 8/2002 Parker et al. ............... 358/1.18

FOREIGN PATENT DOCUMENTS

| EP | 0 571 168 A1 | 11/1993 |
|---|---|---|
| EP | 0 782 067 A2 | 2/1997 |
| EP | 782067 A2 * | 7/1997 |
| EP | 0 820 004 A1 | 1/1998 |
| EP | 820004 A1 * | 1/1998 |
| JP | 06-103004 A | 4/1994 |
| JP | 10-187368 A | 7/1998 |
| JP | 10-244715 A | 9/1998 |
| JP | 11-170656 A | 6/1999 |
| JP | 11-240227 A | 9/1999 |
| JP | 11-327822 A | 11/1999 |
| JP | 2000-039979 A | 2/2000 |

* cited by examiner

*Primary Examiner*—Edward L. Coles
*Assistant Examiner*—Thierry L Pham
(74) *Attorney, Agent, or Firm*—Sughrue Mion, PLLC

(57) ABSTRACT

A printer system flexibly adaptable to various printer languages. The printer system combines a printer device and at least one data processing device. The data processing device and the printer device respectively have an intermediate code generating element for generating the intermediate code compatible with the print data and an intermediate code rasterization element for rasterizing the generated intermediate code into print image information. The printer device further has a printing element for controlling print image information rasterized by an intermediate code rasterization element and prints on the basis of stored print image information. An intermediate code generating element analyzes print data described in a language not corresponding to the intermediate code generating element of the printer device.

9 Claims, 7 Drawing Sheets

FIG. 3

| identification number | calling address of intermediate code rasterizing means |
|---|---|
| 1 | address 1 |
| 2 | address 2 |
| ⋮ | ⋮ |
| N | address N |

FIG. 6 PRIOR ART

PRINTER SYSTEM FLEXIBLY COMPATIBLE WITH PLURALITY OF PRINTER CONTROL LANGUAGES (PCL) USING INTERMEDIATE AND RASTER CODES

BACKGROUND OF THE INVENTION

1. Field of the Invention

The present invention relates to a printer device, a data processing device of print data, and a printer system including these devices.

2. Description of the Related Art

In a typical printer system, a printer device is connected to a host computer and a program referred to as a printer driver for operating a printer is installed in the host computer.

A printer driver in a host computer converts print objective data to print data described in a printer-understandable format, namely, a printer-interpretable language (printer control language), and this print data is sent to a printer by an operating system. Printer control languages have been independently developed by the respective printer makers and the like and there are various types of printer control languages such as ESC/Page, Post Script and so on.

A printer device receives print data described in a printer control language, performs language analysis of the print data, and converts the print data to an intermediate code adaptable to processing within a printer (generation of an intermediate code). For example, an intermediate code can be expressed as display lists composed of printable small segments including fonts, image, operands for graphic operation such as "LINE", "ARC" and so forth. The printer device thereafter rasterizes the intermediate code into a bit image (rasterization of an intermediate code) and conducts printing.

Here, if one page worth of bit image is to be entirely stored, a large storage area would be required and the memory efficiency will be reduced.

Therefore, conventionally, one page worth of bit image was divided with a plurality of bands, and an intermediate code as generated and rasterized into a bit image in such band units. Then, the printer device successively releases storage areas with respect to the bit image that has been printed, and controls the bit image of the following bands to be stored in the released storage areas (print control). In this structure, memory efficiency may be improved as it is sufficient to maintain storage areas only for a few bands. The storage area for such few bands is called a band buffer.

SUMMARY OF THE INVENTION

At present, there are various kinds of printer control languages and it is anticipated that new printer control languages will also be developed in the future.

Nevertheless, it is much inconvenient and becomes a burden for users if one printer is only compatible with one printer control language, as users need to purchase a printer device for every language. Therefore, realization of a printer device compatible with a plurality of languages is desired.

Here, as an intermediate code is generated on the basis of a printer control language, an intermediate code greatly depends on a printer control language. Therefore, in order to constitute a printer device compatible with a plurality of printer control languages, the processing of an intermediate code is an important issue.

The first idea is a method of internally providing to a printer device an intermediate code generating and rasterizing module compatible with each language.

But as a printer control language is a top secret of a company that has developed it, it is not necessarily easy to fixedly equip the generating module or the rasterizing module of intermediate codes compatible with each language within one specific printer device in advance. Moreover, even if it is possible to equip them, to priory equip them within a printer device increases the cost and the module of the languages which are not used will be wasted. Further, in this method, the printer will not be compatible with newly developed languages.

The second idea is a method of providing the intermediate code generating and rasterizing module compatible with each language outside of the printer device. In fact, the intermediate code generating and rasterizing module is provided as an option board as shown in FIG. 6 for Post Script.

However, as the option board is constituted while including a print control module, there is a problem in that it is difficult to use for general purposes. As the print control module is a module to directly access a print engine, it greatly depends on the print engine. Thereby, the option board including the print control module itself also depends on the print engine greatly and a problem arises in that it becomes extremely difficult to develop the option board compatible with a plurality of print engines.

The third idea is a method of creating an intermediate code which is common to a plurality of languages, or translating languages of other companies into language of any specific company. With this method, the printer device would suffice to the intermediate code generating and rasterizing module compatible with a single intermediate code.

Nevertheless, whether a common intermediate codes is constructed or languages of other companies are translated, it is impossible to realize a printer device compatible with a plurality of languages unless each of the languages is understood in either case. As mentioned above, the information of the printer control language is a top secret of developing manufacturer, and it is not easy to understand each language. Moreover, even if it is possible to understand it, enormous efforts are required for the construction of a common intermediate code or the translation of languages. Furthermore, there is a problem in that it considerably lacks flexibility of compatibility with new languages since the construction of a common intermediate code must be conducted all over again.

Therefore, an object of the present invention is to provide a printer device and a printer system flexibly compatible with many languages and new languages.

Moreover, another object of the present invention is also to provide a data processing device compatible with a plurality of print engines in generating and rasterizing intermediate codes and which may be used for various objects.

A printing method of the present invention is a printing method to be used in a printer system combining a printer device and a data processing device, comprising a determination step for determining the type of language of input print data, selecting an intermediate code generating means on the basis of the determination result, and delivering the print data to the selected intermediate code generating means, in the printer device; an intermediate code generating step for generating the intermediate code corresponding to the print data by performing language analysis of the print data, and outputting the intermediate code identification information, in the intermediate code generating means of the printer device or the intermediate code generating means of the data processing device; and a print control step for selecting the intermediate code rasterizing means on the basis of intermediate code identification information input from the intermediate code generating means, controlling print image information rasterized by the selected intermediate code rasterizing means to be stored in a prescribed storage area of the printer device, and printing on the basis of the stored print image information, in the printer device.

Furthermore, a printing method of the present invention may be executed by a computer, for which a computer program can be installed or loaded into the computer through various media such as a CD-ROM, magnetic disk, semiconductor memory and communication network.

A printer system of the present invention is a printer system combining a printer device and at least one data processing device, wherein the data processing device comprises an intermediate code generating means for generating an intermediate code corresponding to the print data by performing a language analysis of the print data and an intermediate code rasterizing means for rasterizing the generated intermediate code into print image information, and wherein the printer device comprises a printing means for controlling the print image information rasterized by the intermediate code rasterizing means to be stored in a prescribed storage area of the printer device, and prints on the basis of the stored print image information.

A printer device of the present invention comprises a determination means for determining the type of language of the input print data, selecting an intermediate code generating means on the basis of the determination result and delivering the print data to the selected intermediate code generating means, and a printing means for controlling print image information rasterized by the intermediate code rasterizing means to be stored in a prescribed storage area of the printer device and conducting printing on the basis of the stored print image information.

A data processing device of the present invention is a data processing device to be used in combination with the printer device, wherein the data processing device comprises an intermediate code generating means for generating an intermediate code compatible with the print data by performing language analysis of the print data and an intermediate code rasterizing means for rasterizing the generated intermediate code into print image information, and the intermediate code generating means of the data processing device is capable of analyzing the print data described in a language not solely compatible with the printer device.

BRIEF DESCRIPTION OF THE DRAWINGS

FIG. 3 is a table showing the corresponding relation between an identification number and the intermediate code rasterizing means;

DESCRIPTION OF THE PREFERRED EMBODIMENTS

Embodiment 1

Figure 1:
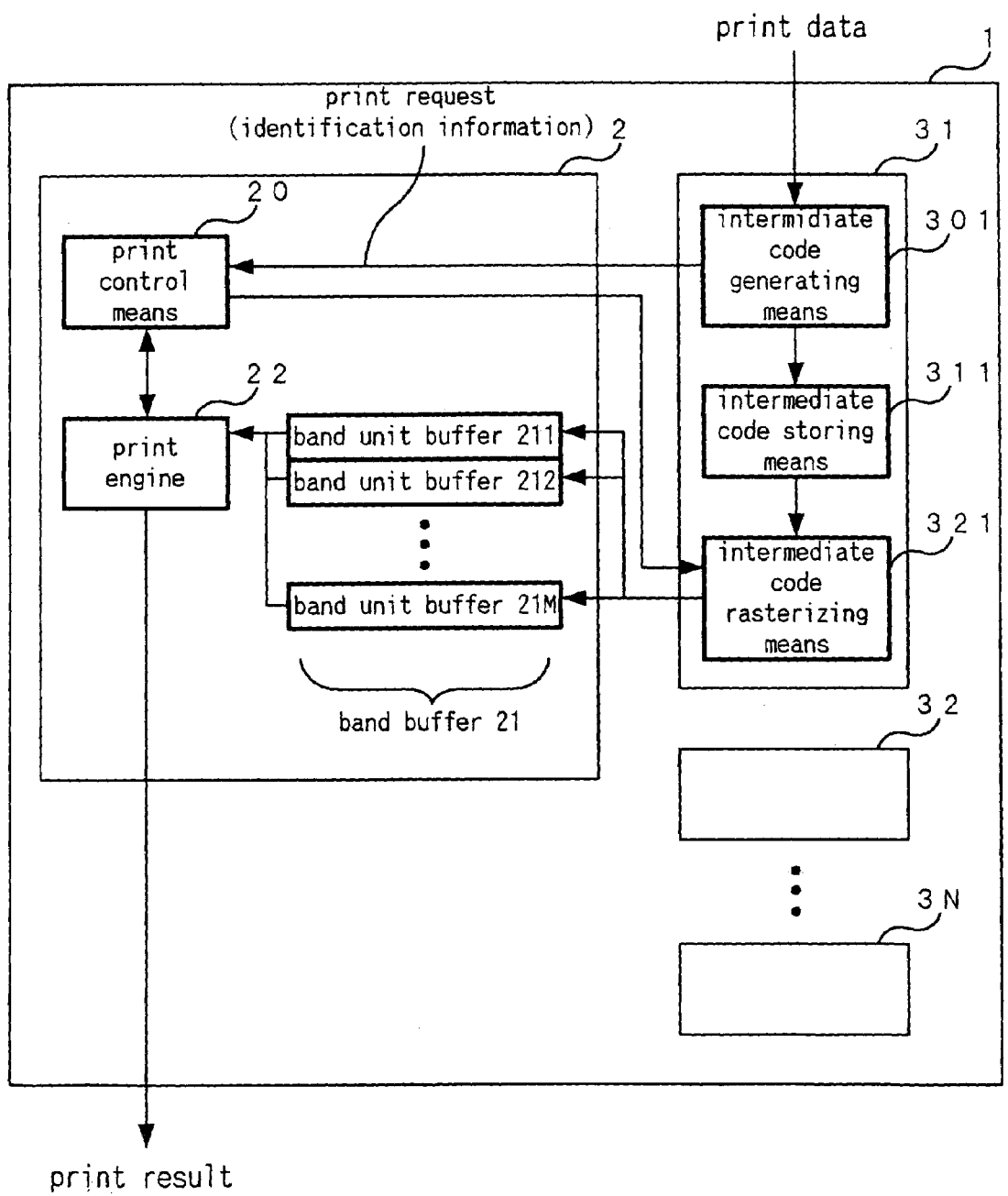
FIG. 1 is a block diagram showing a structure of Example 1 of Embodiment 1 of the present invention.

Embodiment 1 of the present invention is now explained with reference to FIG. 1. A printer system 1, which is Embodiment 1 of the present invention, comprises a printer device 2, and data processing devices 31 to 3N. N means the number of data processing devices that the printer system 1 comprises, and $N_{-1}$. Each of the data processing devices respectively corresponds to one type of printer control language, in other words, one type of intermediate code, and a printer system compatible with N-types of printer control languages will include N-types of the data processing devices.

Here, the printer device 2 and the data processing devices 31 to 3N do not necessarily require to be physically separated, for example, they may be set up within one printer body. Moreover, the data processing devices are also realized as a printer card and a printer option board.

The printer device 2 comprises a printing means, which has a print control means 20, a band buffer 21, and a print engine 22 for outputting bit images to a paper.

Each of the data processing devices 31 to 3N is respectively comprise intermediate generating means 301 to 30N, intermediate storing means 311 to 31N and intermediate code rasterizing means 321 to 32N.

Each of the means would suffice for the printer device 2 and the data processing devices 31 to 3N, which may be physically realized by a system dedicated to printer control or data processing, or an information processing device for general purposes. For example, in an information processing device of general structure comprising an arithmetic means and a storing means, it is possible to generate each means as a task on a computer by activating software prescribing each operation of the print control means, the intermediate code generating means and the intermediate code rasterizing means.

Example 1

Hereafter, Example 1 of Embodiment 1 is explained. Firstly, the structure and operation of the data processing devices are explained with reference to the data processing device 31.

The intermediate code generating means 301 receives print data described in printer control language compatible with the intermediate code generating means 301, generates an intermediate code by analyzing the contents thereof, and stores the intermediate code in the intermediate storing means 311. Here, when it is possible for the intermediate code rasterizing means 321 to refer to an intermediate code, an intermediate code may be stored outside of the data processing device 31. For example, it may be stored in the storing means of the printer device 2 (not shown).

The intermediate code generating means 301 sends print request information to the print control means 20 at the time of completion of generating intermediate codes for one page worth of print data. The print request information includes identification information of the intermediate code generated in the data processing device.

The identification information may be any kind of information which is unique to each of the intermediate codes. For example, it is possible to provide an identification number to each intermediate code in advance, and then to use such identification number. Furthermore, as each of the intermediate code rasterizing means 321 to 32N respectively corresponds to a type of intermediate code, the identification data of the intermediate code rasterizing means 321 to 32N (for example calling address) may be used as an intermediate code identification information.

Figure 2:
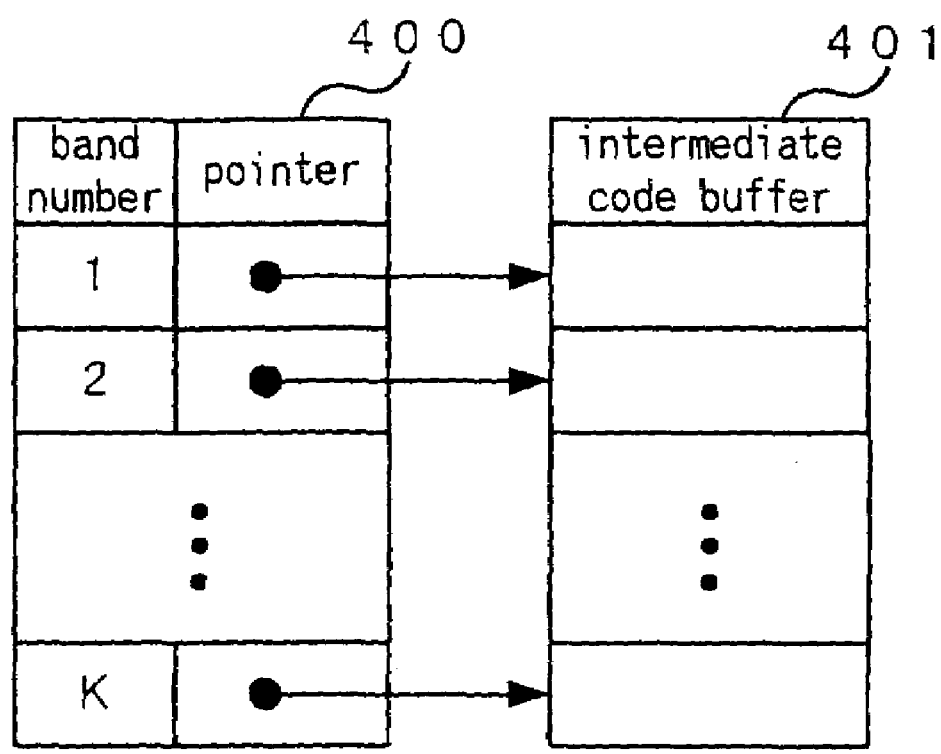
FIG. 2 is a diagram explaining the intermediate code storing means of Embodiment 1 of the present invention.

The intermediate code storing means 311 stores intermediate code in correspondence to band numbers (band positions). For example, as shown FIG. 2, it is structured with a table 400, in which the band number and the storage location (pointer) of the intermediate code corresponded with each other, and an intermediate code buffer 401 in which the intermediate code is actually stored.

The intermediate code rasterizing means 321 receives address information from the print control means 20 and reads out one band worth of intermediate codes in a prescribed order (for example the order of band numbers), while referring to the intermediate code storing means 311. And one band worth of intermediate codes is rasterized into bit images and stored on the basis of the address information.

In the data processing device, the bit image rasterized by each of the intermediate code rasterizing means is printed by the control of the print control means 20 outside of the data processing device. That is, as the data processing device does not include a part depending on the print engine, it is compatible with a plurality of print engines and used for various purposes.

Next, the structure and operation of the printer device 2 are explained.

A band buffer 21 is structured by a plurality of band unit buffers 211 to 21M, and each of the band unit buffers is respectively able to store the bit image of the band unit. M is the number of the band unit buffer, and, for example, such as M=3 may be considered.

A print engine 22 is activated by the print control means 20 at the stage of completion of the rasterizing process of bit images for a prescribed number of plurality of bands, and thereafter reads out the bit image in order at a certain speed from the band unit buffers 211 to 21M within the band buffer 21 and conducts printing. The print engine 22 notifies the print control means 20 of completion of printing on band unit buffers.

Here, the structure where the printer device 2 activates at the stage of completion of the rasterizing process of bit images for a prescribed number of plurality of bands is for preventing the rasterizing process of the bit image to the band buffers to be late for the print speed of the print engine 22 (over-run error). Therefore, when the processing speed of the rasterizing process of the bit image is sufficiently fast, the print engine 22 may cause to be activated at the time of completion of the image rasterization of the first one band.

The print control means 20 has functions of activating the print engine 22, selecting the intermediate rasterizing means 321 to 32N and controlling the rasterization of the bit image to the band buffer 21.

The print control means 20 receives print request information from any of the intermediate code generating means 301 to 30N, and extracts the identification information of the intermediate code from the print request information, and selects one of the intermediate code rasterizing means 321 to 32N on the basis of the identification information. FIG. 1 describes the situation, in which the print request information is received from the intermediate code generating means 301 and the intermediate code rasterizing means 321 is selected.

Here, as the identification information, for example, the identification number priory determined every intermediate code can be used. In this case, by storing a table as shown in FIG. 3, the intermediate code rasterizing means can be selected with reference to the table.

Furthermore, each of the calling addresses of the intermediate code rasterizing means 321 to 32N may be used as they are. In this case, the print control means 20 can select and call one of the intermediate code rasterizing means 321 to 32N by making a direct call of the extracted calling address. In this method, the table is not required to be stored in advance so that it can be compatible with a new intermediate code without changing the structure.

The print control means 20 calls out the selected intermediate code rasterizing means by transmitting a leading address as an address information of the available band unit. In this result, one band worth of bit images is rasterized into the band unit buffer corresponding to the leading address.

The print control means 20 activates the print engine 22 at the stage of completion of rasterization of the bit image into the prescribed number of the band unit buffer. As a result, the print engine 22 starts printing.

The print control means 20 receives a notice of the band unit buffer storing the printed bit image from the print engine 22, and releases the band unit buffer and makes it available.

Figure 4:
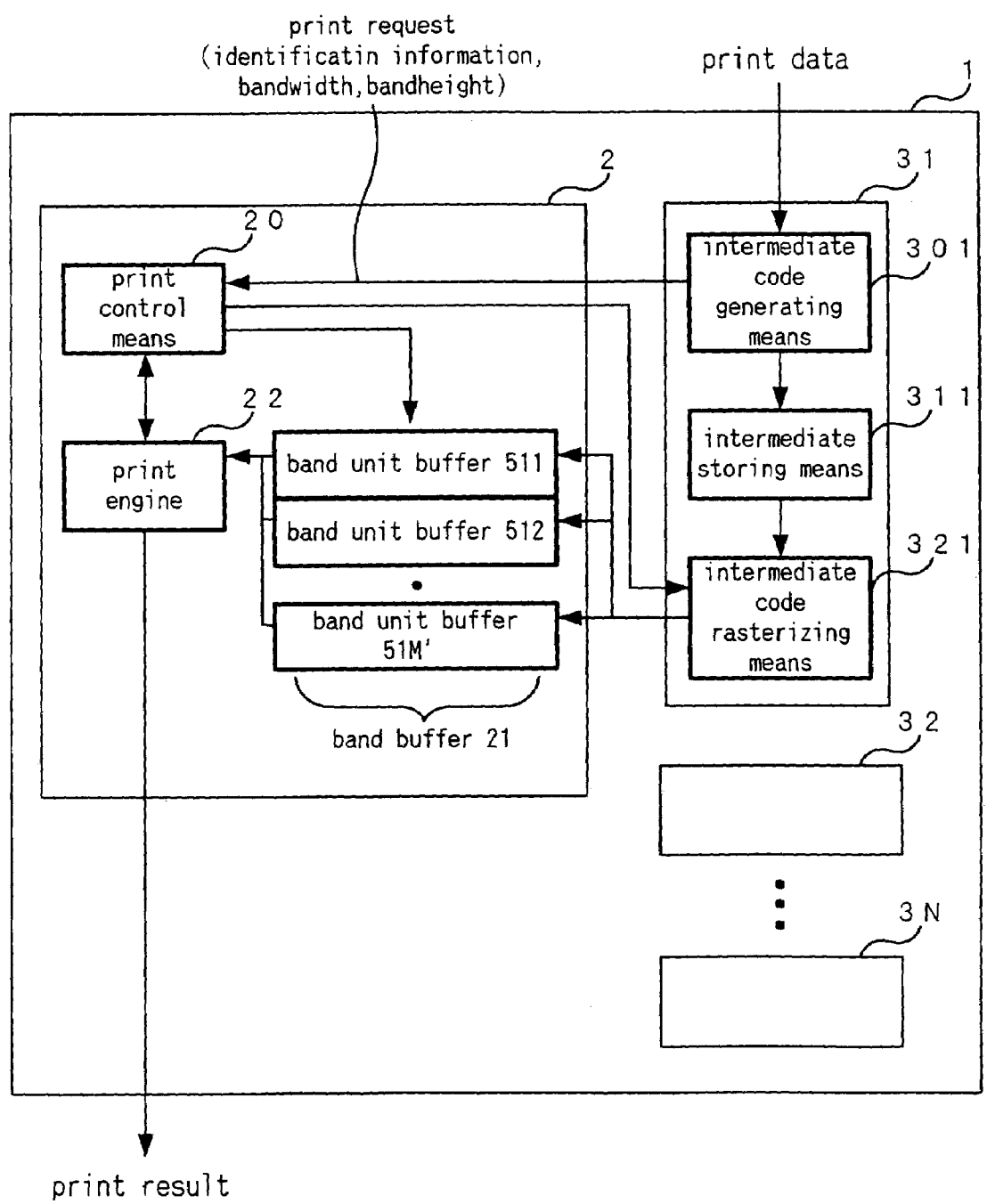
FIG. 4 is a flowchart showing the operation of the print control means.

FIG. 4 is a flowchart of explaining an example of operation of the print control means 20. In this example, each calling address of the intermediate code rasterizing means 321 to 32N is used as identification information.

In step S600, all of the band unit buffers are released to be available as an initialization. In step 601, whether there is any available band unit buffer is judged, and in case that there is any available band unit buffer, the operation proceeds to step S602, otherwise, the operation proceeds to step S603. In step S602, one of the intermediate code rasterizing means 321 to 32N is called out on the basis of the identification information with the leading address of the available band unit buffer as a parameter. In step S603, whether there is a prescribed number of band unit buffers, in which the rasterized bit images are stored, is judged, and when there is a prescribed number, the operation proceeds to step S604, and otherwise, the operation proceeds to step S605. In step S604, when the print engine 22 is activated, when it is not already activated. In step S605, whether there are band unit buffers, in which the bit images are printed, is judged, and when there are such band unit buffers, the operation proceeds to step S606, and otherwise, it proceeds to step S607. In step S606, the band unit buffers are released and made available. In step S607, whether one page worth of print data is all rasterized is judged, and in case that it is not rasterized, the operation proceeds to step S601, and otherwise, the operation is terminated.

As the printer device 2 has the structure of selecting the intermediate code rasterizing means and calling them out on the basis of the identification information, it has a structure compatible with a plurality of intermediate codes. Moreover, as the printer device 2 does not necessarily require the intermediate code generating means and rasterizing means within the printer device, it is compatible with many languages and new languages without having to understand other languages.

Example 2

Next, Example 2 of Embodiment 1 is explained. This Example 2 is the same as Example 1 with regard to the structure, in which the printer device 2 and the data processing devices 31 to 3N are included, but differs in respect that the intermediate code generating means 301 to 30N output identification information as well as information of bandwidth and bandheight, and the print control means 20 dynamically restructures the band buffer 21.

The structure and the operation of the data processing device is now explained with reference to the data processing device 31.

The intermediate code generating means 301 receives print data described in a print control language compatible with the intermediate code generating means 301, generates an intermediate code by analyzing the contents thereof and stores the intermediate code in the intermediate code storing means 311.

And at the time of completion of generating the intermediate codes of one page worth of the print data, the print request information is sent to the print control means 20. The print request information includes the identification information of the intermediate code generated in the data processing device and the information of bandwidth and bandheight.

The identification information may be determined in the same manner as that of Example 1.

The information of bandwidth and bandheight is the information that specifies the width and the height of the band unit buffers, and is determined every intermediate code (or language) to make the band unit buffer the appropriate size (width and height) to each of the intermediate codes, and is respectively stored in each of the intermediate code generating means 300 to 30N.

As an intermediate code storing means 311 and an intermediate code rasterizing means 321 have the same structure and operation as those of Example 1, the explanation thereof is omitted.

Next, the structure and the operation of the printer device 2 are explained.

The print control means 20 has functions restructuring the band buffer 21, activating the print engine 22, selecting the intermediate code rasterizing means 321 to 32N, and controlling the rasterization of the bit image into the band buffer 21.

As the functions of activating the print engine 22, selecting the intermediate code rasterizing means 321 to 32N, and controlling the rasterization of the bit image to the band buffer 21 are the same of those of Example 1, the explanations thereof are omitted. The function of restructuring the band buffer 21 is now explained.

The print control means 20 receives the print request information from any of the intermediate code generating means 301 to 30N and extracts the information of bandwidth and bandheight from the print request information. And the band buffer 21 is restructured on the basis of the information of bandwidth and bandheight. Here, restructure means to make a change of a leading address of the band unit buffer in accordance with the size of the band. Concretely, considering that the bandwidth and the bandheight are respectively regarded as a and b, restructure may be performed, by making the leading address of the first band unit buffer the leading address of the band buffer 21, and setting the leading address of the band unit buffer after the second from the leading address of the band buffer 21 in a×b intervals.

As the result of the band buffer 21 is restructured by the print control means 20, it would be structured from a plurality of the band unit buffers 511 to 51M'. M' is given in (storage capacity of the band buffer 21) mod (a×b).

Generally, the size (width and height) of the band unit buffer is closely connected with the occurrence of an overrun error relating to the rasterizing speed of the intermediate code. According to the structure of this example, as the width and the height of the band unit buffer may be appropriately set every intermediate code (or language), in other words, every intermediate code rasterizing means, the occurrence of an overrun error can be prevented.

OTHER MODIFICATIONS

Figure 7:
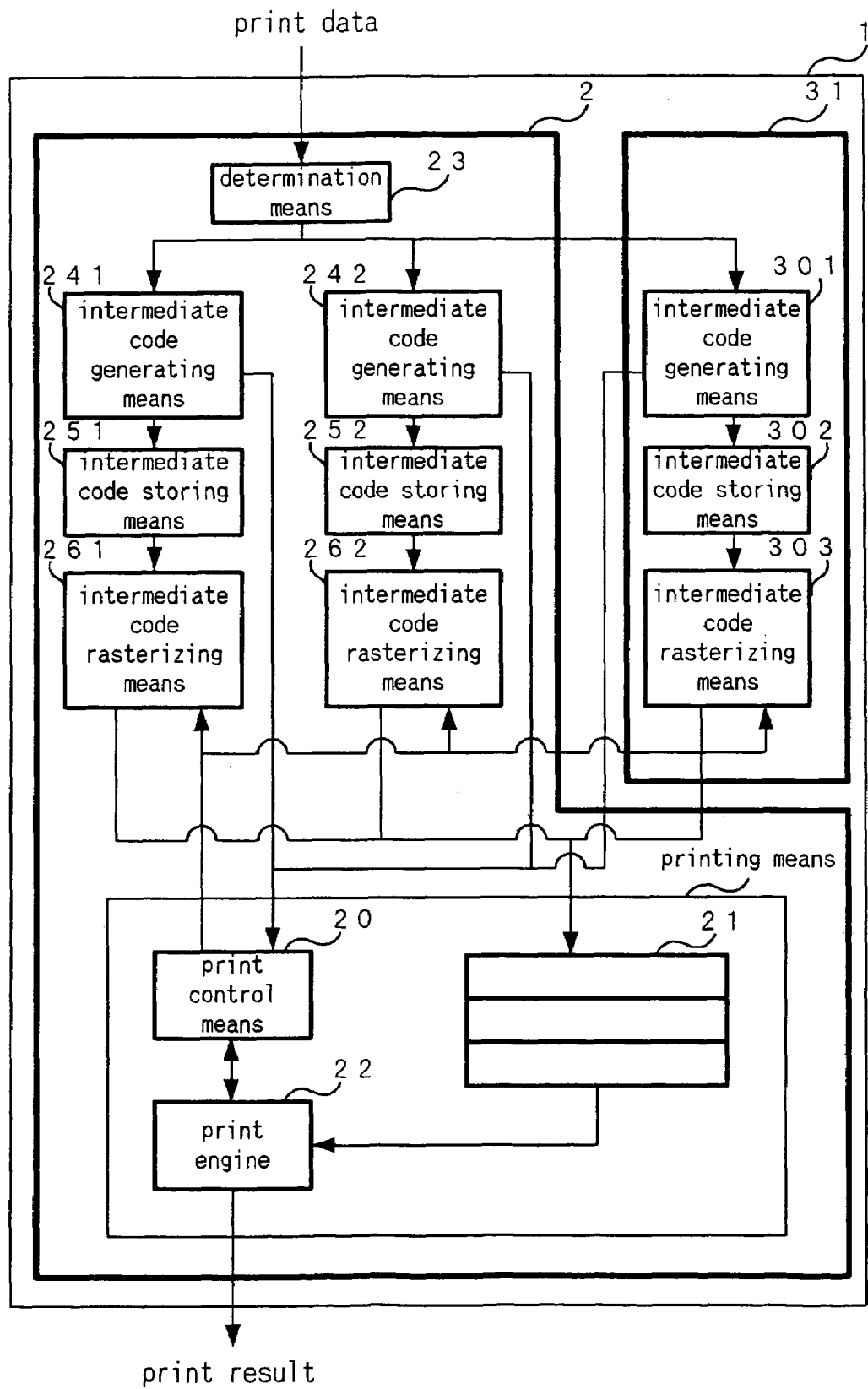
FIG. 7 is a block diagram showing a modification of Embodiment 1 of the present invention.

As modifications of Example 1 and Example 2, the structure where the printer device 2 comprises the printer device 2 as well as a determination means 23 is conceivable (refer to FIG. 7).

The determination means 23 determines the type of language of the print data input to the printer device 2 from the outside, selects the intermediate code generating means compatible with the type of the language on the basis of the determination result, and delivers the print data to the selected intermediate code generating means.

Moreover, as shown in FIG. 7, the also possible is a structure where the printer device 2 comprises the intermediate code generating means 241 to 24P, the intermediate code storing means 251 to 25P, and the intermediate code rasterizing means 261 to 26P. In the example shown in this Figure, P is regarded as 2.

Each of the intermediate code generating means and the intermediate code rasterizing means respectively corresponds to one type of printer control language, in other words, one type of intermediate code, and P is equivalent to the number of languages solely compatible with the printer device. Each of the intermediate code generating means, the intermediate code storing means and the intermediate code rasterizing means is generally the same structure and operation as those of each means that the data processing device comprises.

In this case, the intermediate code generating means selected by the determination means 23 becomes any of the intermediate code generating means 241 to 24P that the printer device 2 comprises and the intermediate code generating means 301 to 30N that each of the data processing devices comprises.

For example, for intermediate code of a specific printer control language, the intermediate code generating means, the intermediate code storing means and the intermediate code rasterizing means within the printer device 2 enable the handling, and for the intermediate code of the other printer control languages, the data processing device enables the handling.

In these modifications, the print data described in the specific printer control language may be printed without the data processing device.

Moreover, even if the print data described in the language not solely compatible with the printer device is input to the determination means, the print data described in the language may be also printed by combining the data processing device comprising the intermediate code generating means and the intermediate code rasterizing means compatible with the language with the printer device.

Embodiment 2

Next, Embodiment 2 of the present invention is explained. Embodiment 2 comprises a storage medium in which printing programs are stored. This storage medium may be CD-ROMs, magnetic disks, semiconductor memories and other storage mediums, and the case where printing programs are distributed through a network is included. Furthermore, the case where printing programs are distributed as the printer cards or the printer option boards is included.

The first printing program is loaded to the information processing device through the storage medium and controls the operation of the information processing device. The information processing device generates one of the print control tasks by controlling the first printing program. The print control task selects and calls one of a plurality of intermediate code rasterization tasks on the basis of the identification information of the intermediate code, and controls the print image information rasterized by the called intermediate code rasterizing task to be stored in a prescribed storage area.

The print control task may restructure the prescribed storage area on the basis of the information of bandwidth and bandheight output by the intermediate code generating task, the rasterized print image information to be stored in the band buffer in band units.

Figure 5:
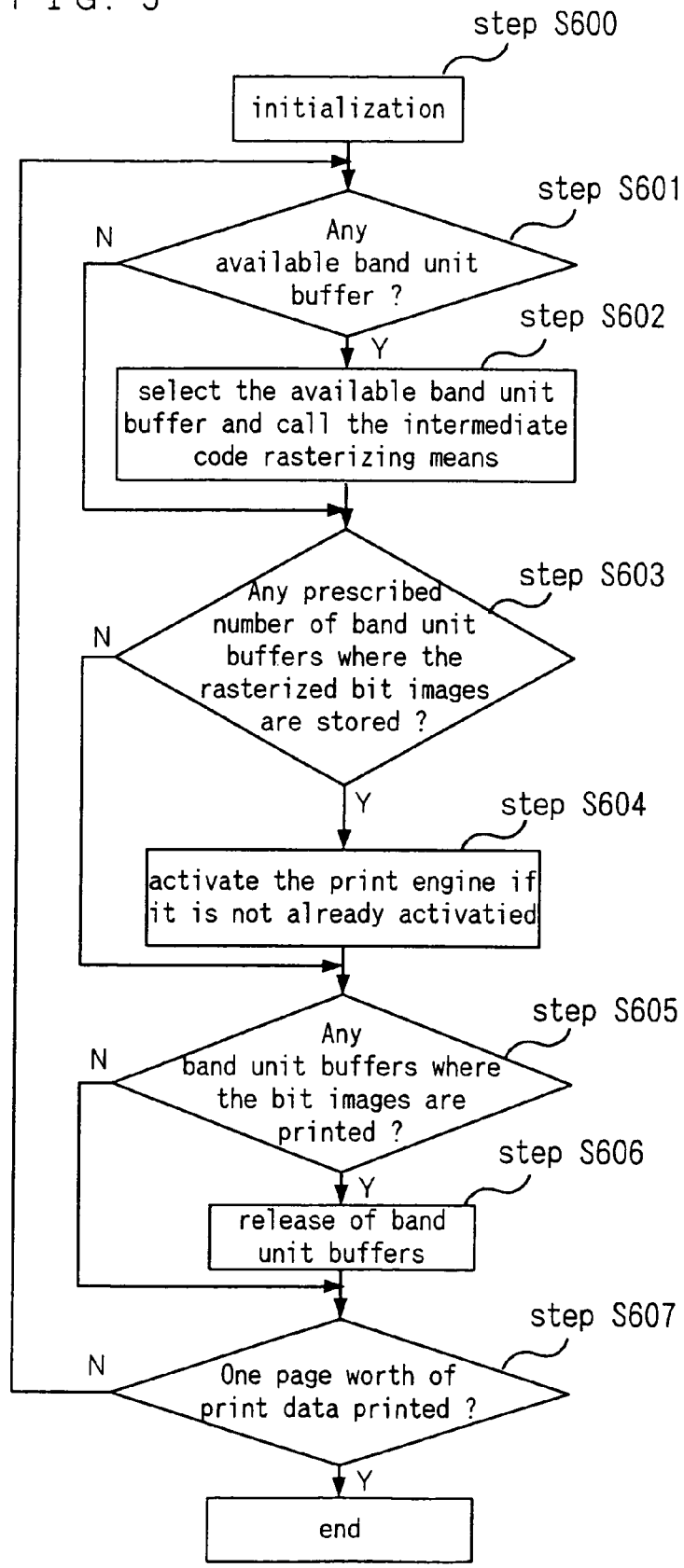
FIG. 5 is a block diagram showing the structure of Example 2 of Embodiment 1 of the present invention.
Figure 6:
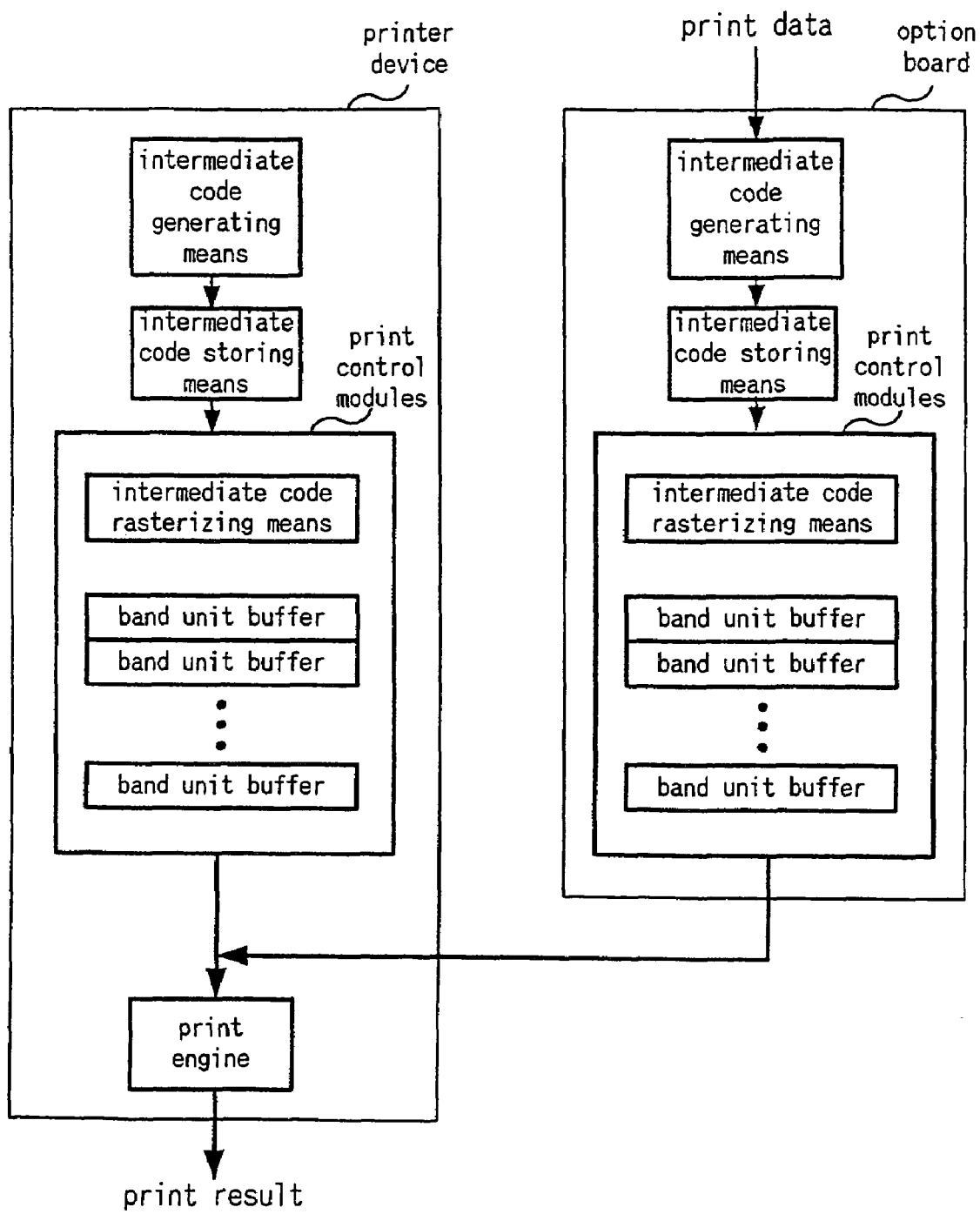
FIG. 6 is a block diagram showing the structure of the conventional art.

Namely, the information processing device conducts the same process as that of the print control device 20 as shown in FIG. 1 or 5, by controlling the first printing program.

The second printing program is loaded to the data processing device through the storage medium and controls the operation of the data processing device. The data processing device generates the intermediate code generating task that generates the intermediate code and outputs the identification information on the basis of the print data, and the intermediate code rasterization task which rasterizes the intermediate code to the bit image by controlling the second printing program.

The intermediate code generating task may also be structured to output the information of bandwidth and bandheight.

Namely, the data processing device conducts the same process as that of the intermediate code generating means and the intermediate code rasterizing means in FIG. 1 or 5 by controlling the second printing program.

Moreover, this invention is not limited to each of the embodiments and may be applied to various forms by modification.

As the present invention is structured to select and call the intermediate code rasterizing means on the basis of the identification information, it is capable of being compatible with a plurality of intermediate codes. Further, as it is not necessarily required to comprise the intermediate code generating means and intermediate code rasterizing means within the printer device, this invention may be compatible with many languages and new languages without having to understand the languages.

Moreover, as the present invention has a structure where the bit image rasterized by the intermediate code rasterizing means is printed by controlling the outside print control means, and parts depending on the print engine are not included within the data processing device, and a data processing device compatible with a plurality of the print engines and for general purposes is realized.

The entire disclosure of Japanese Patent Application No. H11-208293 filed on Jul. 22, 1999 and No. 2000-80470 filed on Mar. 22, 2000 including specification, claims, drawings and summary are incorporated herein by reference in its entirety.

What is claimed is:

1. A printer device, comprising:

receiving means for receiving print data;

a plurality of intermediate code generators, at least one being operable to generate intermediate code compatible with said print data by performing a language analysis of said print data;

a plurality of intermediate code rasterizing means for respectively rasterizing the generated intermediate code into print image information;

determination means for determining which one of a plurality of different printer languages said print data corresponds to, selecting a particular intermediate code generator on the basis of the determination result, and delivering said print data to said selected intermediate code generator, and printing means for controlling the print image information rasterized by the plurality of intermediate code rasterizing means to be stored in a prescribed storage area of said printer device, and printing on the basis of said stored print image information, wherein said selected intermediate code generator generates an intermediate code and outputs identification information corresponding to said intermediate code to said printing means, and wherein said printing means selects a particular intermediate code rasterizing means on the basis of intermediate code identification information input from said selected intermediate code generator, and controls print image information rasterized by said selected intermediate code rasterizing means.

2. A printer device according to claim 1,

Wherein said selected intermediate code generator further outputs information of bandwidth and bandheight compatible with an intermediate code, and Wherein said printer restructures said storage area on the basis of information of bandwidth input through the intermediate code generator, and controls said rasterized print image information to be stored in said prescribed storage area restructured in band units.

3. A printer device according to claim 1, wherein said printing means stores a corresponding relation between intermediate code identification information and said plurality of intermediate code rasterizing means, and selects the intermediate code rasterizing means with reference to the corresponding relation.

4. A printer device according to claim 1, wherein said intermediate code identification information includes address information for calling the corresponding intermediate code rasterizing means.

5. A printer device according to any one of claims 1, 3 and 4, wherein said printing means restructures bandwidth and bandheight which comply with each intermediate code, and controls said rasterized print image information to be stored in said prescribed storage area restructured in band units.

6. A printing method to be used in a printer system combining a printer device and a data processing device, comprising:

a determination step for determining the type of language of input print data, selecting an intermediate code generating means on the basis of the determination result, and delivering said print data to said selected intermediate code generating means, in said printer device; and an intermediate code generating step for generating the intermediate code compatible with the print data by performing language analysis of print data, and outputting the intermediate code identification information, in an intermediate code generating means of said printer device or an intermediate code generating means of said data processing device; and a print control step for selecting an intermediate code rasterizing means on the basis of intermediate code identification information input from the intermediate code generating means, controlling print image information rasterized by said selected intermediate code rasterizing means to be stored in a prescribed storage area of said printer device, and printing on the basis of said stored print image information, in said printer device.

7. A printing method according to claim 6 using the data processing device comprising the intermediate code generating means, wherein the intermediate code of said data processing device is capable of analyzing the print data described in a language not corresponding to the intermediate code generating means of said printer device.

8. A printing method according to claim 6, wherein said print control step selects an intermediate code rasterizing means with reference to the corresponding relation between intermediate code identification information and the intermediate code rasterizing means.

9. A computer readable storage medium storing a program for making a computer execute the printing method according to any one of claims 6 to 8.

* * * * *